(12) United States Patent
Roehrle et al.

(10) Patent No.: US 10,032,050 B2
(45) Date of Patent: Jul. 24, 2018

(54) ELECTRONIC DEVICE, SYSTEM AND METHOD FOR NFC

(71) Applicant: SONY CORPORATION, Tokyo (JP)

(72) Inventors: Klaus Roehrle, Ostfildern (DE); Yo Tabayashi, Stuttgart (DE); Meik Buscemi, Reichenbach (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/316,038

(22) PCT Filed: Jun. 10, 2015

(86) PCT No.: PCT/EP2015/062869
§ 371 (c)(1),
(2) Date: Dec. 2, 2016

(87) PCT Pub. No.: WO2015/189229
PCT Pub. Date: Dec. 17, 2015

(65) Prior Publication Data
US 2017/0103237 A1 Apr. 13, 2017

(30) Foreign Application Priority Data
Jun. 10, 2014 (EP) .................................... 14171763

(51) Int. Cl.
*H04Q 5/22* (2006.01)
*G06K 7/10* (2006.01)
*H04B 5/00* (2006.01)

(52) U.S. Cl.
CPC ..... *G06K 7/10019* (2013.01); *G06K 7/10237* (2013.01); *G06K 7/10297* (2013.01); *H04B 5/0031* (2013.01)

(58) Field of Classification Search
CPC .................. G06K 7/10336; G07C 9/00111
USPC .............. 340/10.51, 10.52, 572.1; 455/41.1
See application file for complete search history.

(56) References Cited

U.S. PATENT DOCUMENTS

| | | | |
|---|---|---|---|
| 6,965,400 B1 * | 11/2005 | Haba ............ | H04N 5/232 348/222.1 |
| 8,576,053 B2 | 11/2013 | Buscemi et al. | |
| 2007/0001853 A1 | 1/2007 | Otranen | |
| 2009/0051498 A1 | 2/2009 | Otranen | |
| 2009/0247077 A1 | 10/2009 | Sklovsky et al. | |

(Continued)

FOREIGN PATENT DOCUMENTS

| | | |
|---|---|---|
| EP | 2 106 107 A1 | 9/2009 |
| EP | 2 442 254 A2 | 4/2012 |
| EP | 2 442 254 A3 | 4/2012 |

OTHER PUBLICATIONS

International Search Report dated Aug. 17, 2015, in PCT/EP2015/062869 filed Jun. 10, 2015.

*Primary Examiner* — Carlos E Garcia
(74) *Attorney, Agent, or Firm* — Oblon, McClelland, Maier & Neustadt, L.L.P.

(57) ABSTRACT

An electronic device for near field communication (NFC) device includes a front end unit configured to communicate with an external reader/writer device, the front end unit including a first memory adapted to store a check identifier, the check identifier configured to match one or more first identifiers, and a processing unit including a second memory configured to store one or more applications and one or more first identifiers, wherein a first identifier is assigned to one or more applications.

17 Claims, 5 Drawing Sheets

(56) References Cited

U.S. PATENT DOCUMENTS

2010/0227553 A1* 9/2010 Charrat ................ G06Q 20/341
455/41.1
2013/0040566 A1   2/2013 Mourtel et al.
2013/0331029 A1  12/2013 Tang et al.
2014/0035727 A1* 2/2014 Nguyen ................ H04W 4/008
340/10.1

* cited by examiner

ELECTRONIC DEVICE, SYSTEM AND METHOD FOR NFC

CROSS-REFERENCING TO RELATED APPLICATIONS

The present application is based on PCT filing PCT/EP2015/062869 filed Jun. 10, 2015, and claims priority to European Patent Application 14171763.7 filed by the European Patent Office on 10 Jun. 2014, the entire contents of each of which being incorporated herein by reference.

BACKGROUND

Field of the Disclosure

The present disclosure relates to an electronic device, system and method for near field communication (NFC).

Description of Related Art

The NFC Forum, a non-profit industry association whose member organizations share development, application, and marketing expertise to develop the best possible solutions for advancing the use of NFC, has defined the NFC controller interface in "NFC CONTROLLER INTERFACE (NCI)", Technical Specification, Version 1.1, Oct. 25, 2013, which describes different mechanisms to configure the NFC controller (NFCC) and to exchange data with the NFC controller and other entities within a device. On the other hand, GlobalPlatform, another cross industry, non-profit association which identifies, develops and publishes specifications that promote the secure and interoperable deployment and management of multiple applications on secure chip technology, is working on standardizing APIs for a trusted execution environment (TEE). The TEE offers a more secure environment in which also signed applications can run. In addition GlobalPlatform is also working on defining secure element access control mechanisms.

Many Android-powered devices that offer NFC functionality already support NFC card emulation. In most cases, the card is emulated by a separate chip in the device, called a secure element. Many SIM cards provided by wireless carriers also contain a secure element. The latest Android platform introduces an additional method of card emulation that does not involve a secure element, called host-based card emulation (HCE). This allows any Android application to emulate a card and talk directly to the NFC reader.

Usually every (physical) card having NFC capabilities has a unique identifier (also referred to as card ID). The reader/writer device sends an anti-collision polling command to learn this ID. Subsequent read or write commands are sent with this ID to address the specific application/card. The HCE feature supported by the latest Android platform allows applications running on the application processor to emulate a contactless card having NFC capabilities. However, the anti-collision is time critical and must be therefore handled by the NFC controller (referred to as front end unit herein). The NFC Forum has specified in the "NFC CONTROLLER INTERFACE (NCI)", specification a mechanism that allows the application processor to configure 0 to 16 anti-collision data sets (for 0 to 16 applications since one set per application is used) for NFC-F.

US 2012/0092137 A1 discloses an NFC device (i.e. an electronic device for NFC communication) including a processor and a front end unit (FEU) to communicate with an external reader/writer device. The FEU stores, by first memory, a first number of sets of application parameters, each set including first and second identifiers. The processor stores, by second memory, the application and a second number of the sets. The FEU receives a communication request from the external device, including a certain first identifier. The FEU checks, when the request is received, whether the certain first identifier is stored in the first memory. If yes, a response is sent to the external device, including a respective second identifier, which is in the same set of parameters as the certain first identifier. The FEU sends, each time a request is received, a response (i.e. an event) to the processor. The processor controls which sets of parameters are stored in the first memory based on the response. Thus, in this document an event mechanism is described that allows an entity, e.g. the application processor (referred to as processing unit herein), to dynamically update the anti-collision configuration depending on the incoming request. This allows the system to handle more applications than the NFC Controller can manage.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide an electronic device, system and method for NFC which reduce the hardware and/or software efforts to enable the handling of a large number of applications.

According to an aspect there is provided an electronic device comprising a front end unit adapted to communicate with an external reader/writer device, and a processing unit including a second memory being adapted to store one or more applications and one or more first identifiers, wherein a first identifier is assigned to one or more applications, wherein the front end unit is further adapted to receive a communication establishment request from the external reader/writer device, the communication establishment request including a certain first identifier, send a response to the reader/writer device and the certain first identifier to the processing unit, when a communication establishment request is received, if the certain first identifier matches a check identifier stored in the front end unit or if the front end unit is configured to send a response to all communication establishment requests, the response including an arbitrary or predetermined second identifier, receive a communication command from the external reader/writer device and forward it to the processing unit, and check if a communication response is received from the processing unit in response to a communication command and, if received, forward it to the external reader/writer device.

According to a further aspect there is provided a method comprising receiving, by a front end unit, a communication establishment request from an external reader/writer device, the communication establishment request including a certain first identifier, sending a response to the reader/writer device and the certain first identifier to a processing unit, when a communication establishment request is received, if the certain first identifier matches a check identifier stored in the front end unit or if the front end unit is configured to send a response to all communication establishment requests, the response including an arbitrary or predetermined second identifier, receiving a communication command from the external reader/writer device and forward it to the processing unit, and checking if a communication response is received from the processing unit in response to a communication command and, if received, forwarding it to the external reader/writer device.

Still further, according to an aspect an electronic system is provided comprising a disclosed electronic device and an external reader/writer device. According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Preferred embodiments are defined in the dependent claims. It shall be understood that the disclosed system, the disclosed method, the disclosed computer program and the disclosed computer-readable recording medium have similar and/or identical preferred embodiments as the claimed electronic device and as defined in the dependent claims.

Contrary to the known electronic device, system and method the disclosed electronic device, system and method are based on the idea to use a single anti-collision data set to handle any number of applications running on the processing unit. This single anti-collision data set is represented by the check identifier which matches a plurality of first identifiers. Hence, only a single identifier, namely the check identifier, is configured within the front end unit (i.e. the NFC controller), which is used for all anti-collision responses, i.e. the responses sent to the external reader/writer device in response to a communication establishment request, by which the external reader/writer device requests to establish a communication with a processing unit, i.e. to use a particular application. Alternatively, the front end unit can be configured to send an anti-collision response in all cases without the need to store and check a check identifier. When creating the anti-collision response, the first identifier (e.g. a system code) contained in the anti-collision request is not taken into account at all or only to a limited extent. However, the processing unit is informed about the requested first identifier. Subsequently, the application selection is done by the processing unit based on the requested first identifier.

The disclosed electronic device, system and method can thus react more quickly to a communication establishment request, can handle an unlimited number of applications as generally possible using the HCE feature, require less (or even no) memory space for storing sets of application parameters, and reduce the need for reconfigurations of these sets of application processors as conventionally required for the known NFC device, system and method.

It shall be noted that the processing unit (sometimes also referred to as device host or application processor) and the NFC controller may be implemented as separate semiconductor devices/chips. For instance, the processing unit may be implemented as electronic host device, as also disclosed herein as separate element, and the NFC controller may be implemented as NFC chip. In other embodiments both the device host and the NFC controller may be implemented as a common semiconductor device/chip. For instance, the device host and the NFC controller may be implemented as common application processor, i.e. the NFC controller may be integrated into the processing unit that previously only implemented the processing unit.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
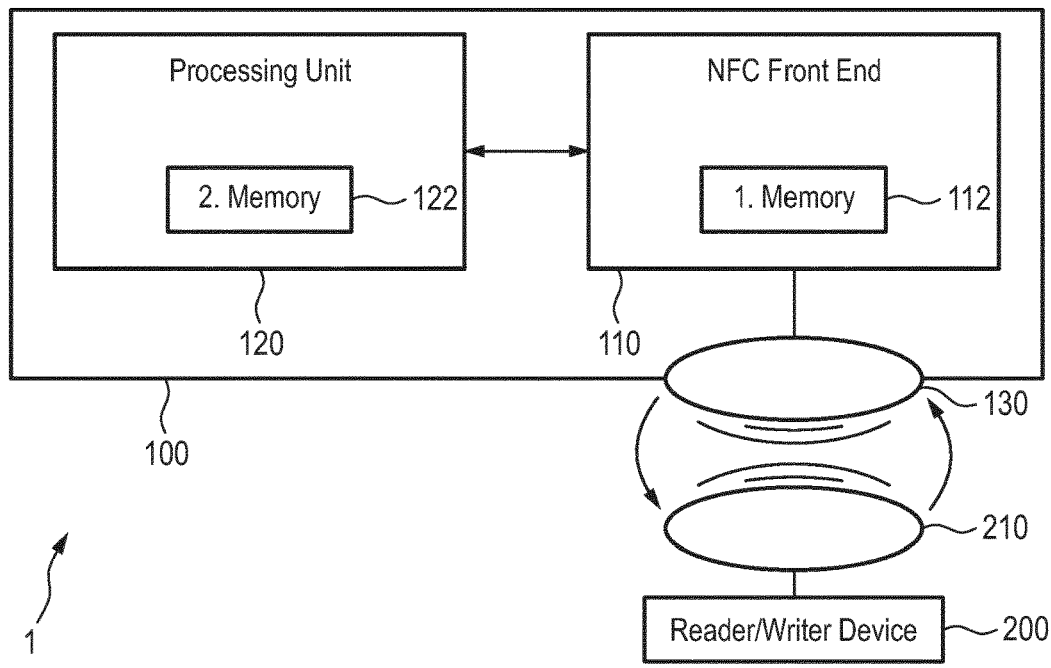
FIG. 1 shows a schematic diagram of an embodiment of an electronic device and system according to the present disclosure.

Referring now to the drawings, wherein like reference numerals designate identical or corresponding parts throughout the several views, FIG. 1 shows a schematic diagram of an electronic device 100 and of an NFC system 1 comprising the electronic device 100 and an external reader/writer device 200 according to the present disclosure. The electronic device 100 comprises a front end unit 110 which is adapted to communicate with the external reader/writer device 200. The front end unit 110 may e.g. be an NFC controller as generally described in the above mentioned standard "NFC CONTROLLER INTERFACE (NCI)".

The electronic device 100 further comprises a processing unit 120. The processing unit 120 may e.g. be a central processing unit. The processing unit 120 may also be referred to as "host" or "application processor". Optionally the processing unit 120 may include one or more application specific data structures storing e.g. data related to a payment service such as e.g. a credit card number or the like. It is also possible, that the processing unit 120 is connected to one or more secure elements included in other storages (not shown), e.g. a Subscriber Identity Module (SIM) card. The term "processing unit" should not be understood in a limiting sense to necessarily have high processing capabilities. Depending on the design of electronic device 100, the processing unit 120 may simply be a memory with little processing capabilities.

The electronic device 100 further comprises an NFC interface 130 connected to the front end unit 110. The NFC interface 130 includes e.g. an antenna for transmitting and receiving signals to/from the reader/writer device 200 which likewise includes a further NFC interface 210.

Conventionally, the front end unit 110 and/or the processing unit 120 comprises a memory for storing first and corresponding second identifiers. Further, the processing unit 120 stores one or more applications. This will be explained with reference to FIGS. 2 and 3 showing flowcharts illustrating the conventional communication between the processing unit 120, the front end unit 110 and the external reader/writer device 200.

Figure 2:
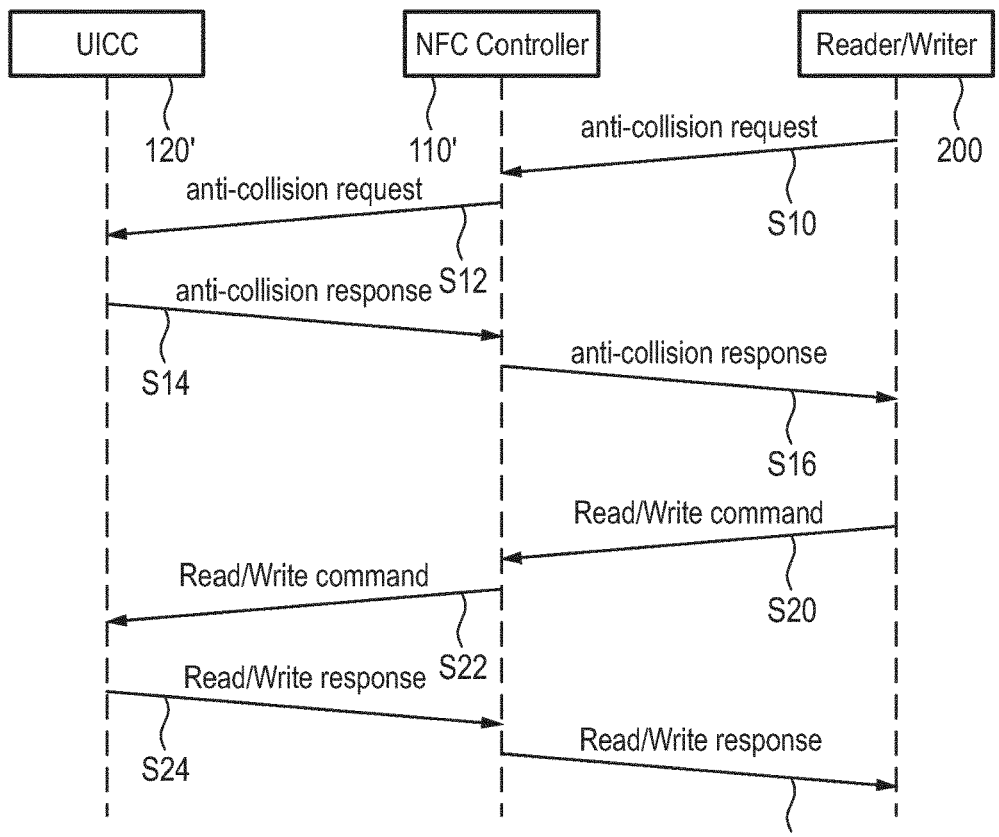
FIG. 2 shows a flowchart illustrating the conventional communication between UICC, NFC controller and external reader/writer device.

FIG. 2 shows a flowchart illustrating the conventional communication between a UICC (Universal Integrated Chip Card, e.g. a SIM card) 120' (as an example of a processing unit), an NFC controller 110' (as an example of an NFC front end unit) and the external reader/writer device 200. When the NFC controller 110' receives a communication establishment request S10 (referred to as anti-collision request in FIG. 2) including a certain first identifier (e.g. a system code), the NFC controller 110' forwards the communication establishment request S12 to the UICC 120'. The UICC stores first identifiers and corresponding second identifiers (e.g. IDs) and sends a corresponding response S14 (referred to as anti-collision response in FIG. 2) including a second identifier. The NFC controller 110' forwards the response S16 to the external reader/writer device 200. Afterwards, the communication is started by forwarding read/write commands (generally referred to as communication commands herein) S20, S22 from the external reader/writer device 200 via the NFC controller 110' to the UICC 120' and by forwarding read/write responses (generally referred to as communication responses herein) S24, S26 from the UICC 120' via the NFC controller 110' to the external reader/writer device 200.

Figure 3:
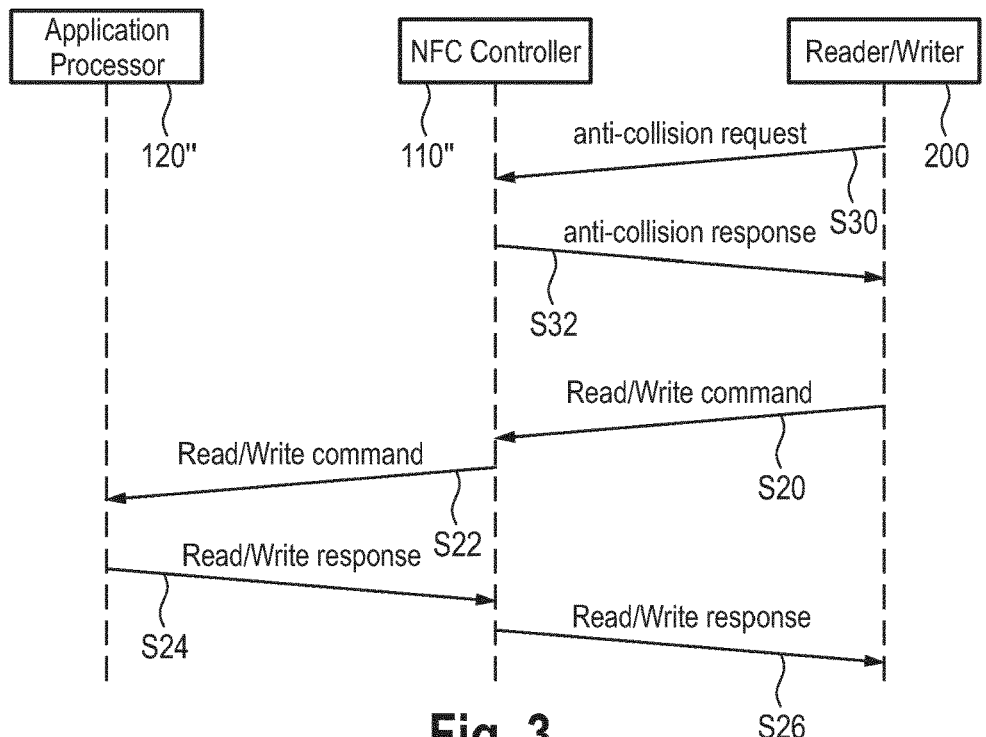
FIG. 3 shows a flowchart illustrating the conventional communication between application processor, NFC controller and external reader/writer device.

FIG. 3 shows a flowchart illustrating another conventional communication between an application processor 120" (as another example of a processing unit, which e.g. runs the operating system), an NFC controller 110" and the external reader/writer device 200. In this embodiment, which e.g. employs HCE, when the NFC controller 110" receives a communication establishment request S30 including a certain first identifier (e.g. a system code), which is stored in the first memory of the NFC controller 110", the NFC controller 110" can immediately respond to the communication establishment request S30 with a response S32 including a respective second identifier. "Immediately" may mean "as soon as possible", "within the next time slot" or "in the time required to send the response" (compared to not responding, re-configuration by the processing unit and the responding on the next command). In some embodiments, the communication protocol between the reader/writer device 200 and the NFC controller 110" may at least partly be time based (time division multiplexed). Subsequently, the communication is performed as explained above with respect to FIG. 2.

The communication establishment request S10, S12, S30 may also be referred to as "anti-collision request" and the response S14, S16, S32 may also be referred to as "anti-collision response". Further, it should be noted that the communication establishment request S20 may be the first request from a reader/writer device for establishing a communication, i.e. when a communication is established no other requests or messages have been exchanged between the reader/writer device 200 and the near field communication device 100. The anti-collision request may be sent at any time and may be used for restarting a connection.

An embodiment of an NFC device and method employing a conventional communication is described in US 2012/0092137 A1, which is herein incorporated by reference. In this document an event mechanism is described that allows an entity, e.g. the application processor, to dynamically update the anti-collision configuration depending on the incoming request. This allows the system to handle more applications than the NFC controller can manage.

According to the above described convention communication methods, In order to create the anti-collision response, the NFC controller needs information about the application, i.e. the first identifier (e.g. the system code) and the second identifier (e.g. the ID). Both have to be configured in the NFC controller. A simplified process is as follows: The system code, which represents the first identifier according to NFC-F, is contained in the anti-collision request. In case this system codes matches a system code configured in the NFC controller, a response with the corresponding ID is sent back. The above mentioned NFC Forum NCI specification defines that an NFC controller can support 0 to 16 sets of anti-collision data. However, in case of HCE the operating system could support many more. In general, the NCI solution cannot scale very well as an increase in the number of anti-collision data sets supported by the NFC chip also increases its memory requirements. The electronic device, system and method according to the present disclosure solve this problem.

One idea of the present disclosure is to configure only a single (arbitrary or predetermined) ID, referred to as second identifier, with the NFC controller (generally referred to as front end unit herein), which is used for all anti-collision responses and which is either stored or generated in the NFC controller. When creating the anti-collision response, the system code (referred to as certain first identifier) in the anti-collision request is not taken into account or only in certain situations or to a certain extent). This is either achieved by checking a received certain first identifier against a check identifier stored in the NFC controller or by ignoring it so that an anti-collision response is sent to the external reader/writer device in all cases without the need to store a check identifier. However, the application processor is informed about the requested system code. Subsequently, the application selection is done on the application processor based on the requested system code.

FIGS. 4 to 7 show flowcharts illustrating an embodiment of the communication between application processor 120''', NFC controller 110''' and external reader/writer device 200 according to the present disclosure (particularly as configured as shown in FIG. 1) in different situations. Preferably, the application processor 120''' uses HCE (host-based card emulation) and thus "emulates" one or more (in particular a plurality) of cards without using a secure element.

The NFC controller 1101''' (or, generally, the NFC front end unit) comprises a first memory (112 as e.g. shown in FIG. 1) for storing a check identifier. Said check identifier is adapted to match one or more (e.g. all) first identifiers. The application processor 120''' (or, generally, the processing unit) comprises a second memory (122 as shown in FIG. 1) for storing one or more applications and one or more first identifiers. Said first identifier is assigned to one or more applications.

A certain first identifier (e.g. a system code) matches if the values (e.g. comprising 2 bytes) are identical whereas wild codes are possible. In the embodiment shown in FIG. 4 the NFC controller 110''' receives a communication establishment request S40 from the external reader/writer device 200, the communication establishment request including a certain first identifier, in this example a system code 0x12FC. Then, the NFC controller 110''' checks (S41), when a communication establishment request is received, whether the certain first identifier (0x12FC) matches the check identifier, in this example 0xFFFF. If it matches, the NFC controller 110''' sends a response S42 to the reader/writer device 200, the response including an arbitrary or predetermined second identifier (e.g. a pre-configured or random ID). Further, it sends the certain first identifier (here the system code 0x12FC) to the processing unit (S44) which may then start the application (S45) to which the certain first identifier is assigned.

In this example 0xFF is used as a wild card in the check identifier. That means if the NFC controller 110''' contains a data set with the system code 0x12FC, then 0x12FC matches as well as 0x12FF as well as 0xFFFC as well as 0xFFFF. The disclosed approach uses a single entry in the NFC controller to support any number of (e.g. FeliCa) applications based on HCE on the application processor 120'''. By configuring an anti-collision data set with a system code of 0xFFFF and an ID that can be any 8 byte value (e.g. platform specific or randomly generated) we can ensure that any incoming request matches.

Now, different situations can be distinguished as illustrated by the differences between the flowcharts shown in FIGS. 4 to 7. In the first and second situations illustrated in FIGS. 4 to 6 it is assumed that the certain first identifier is an identifier that matches the check identifier stored in the first memory, e.g. the certain first identifier is 0x12FC (but is not identical to the check identifier, i.e. is not 0xFFFF) and the check identifier is 0xFFFF.

Figure 4:
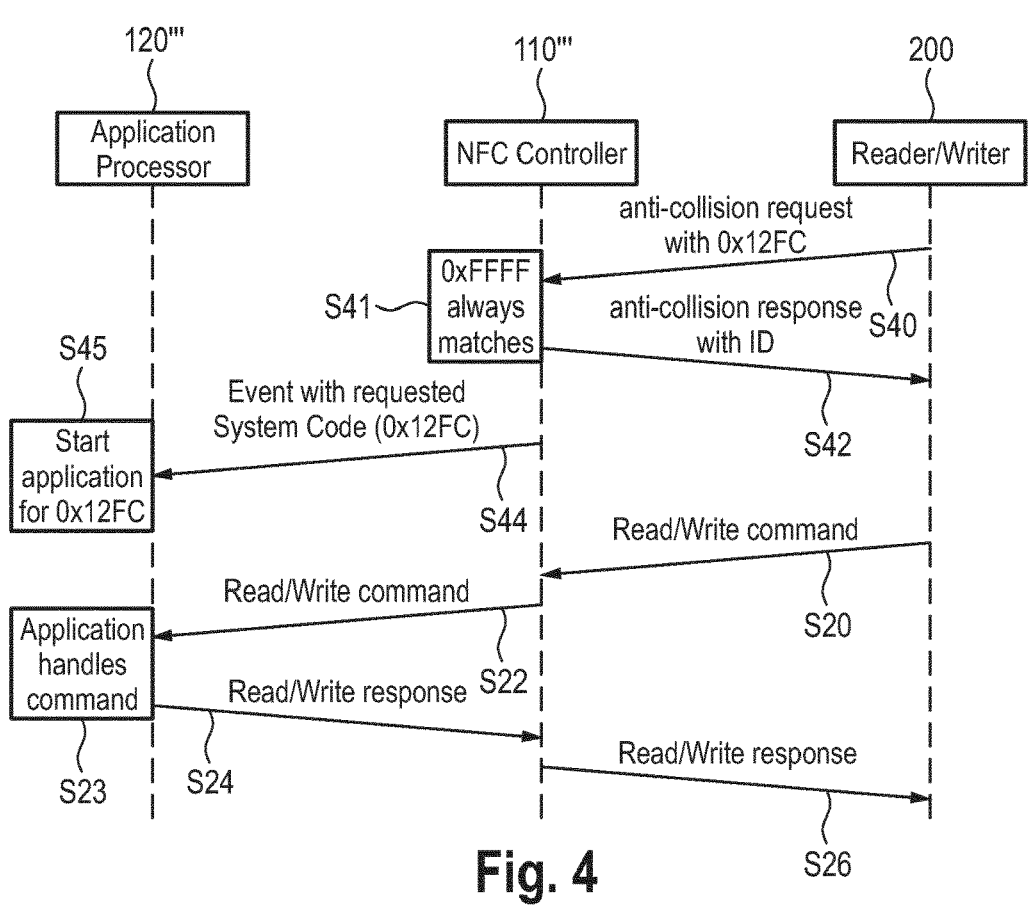
FIG. 4 shows a flowchart illustrating an embodiment of the communication between application processor, NFC controller and external reader/writer device according to the present disclosure in a first situation.

A first situation is illustrated in FIG. 4. If the certain first identifier (0x12FC) is stored in the second memory of the application processor 120''', the communication between the external reader/writer device 200 and the application processor 120''' is established, i.e. read/write commands S20, S22 are forwarded from the external reader/writer device 200 via the NFC controller 110''' to the application processor 120''' and responses S24, S26 are forwarded from the application processor 120''' via the NFC controller 110''' to the external reader/writer device 200, whereby the application processor 120''' (and the application running on it) handles the commands (S23).

Thus, according to this situation after receiving the anti-collision request, an event is sent to the application processor that indicates which system code is requested. According to the above mentioned NCI specification this can be done as part of the existing notification for activating an RF Interface (RF_INTF_ACTIVATED_NTF). If there is an application registered for that system code, then the application is started (or, like in Android, the application might have an already running service that is used for HCE) and it can process the subsequent commands.

Figure 5:
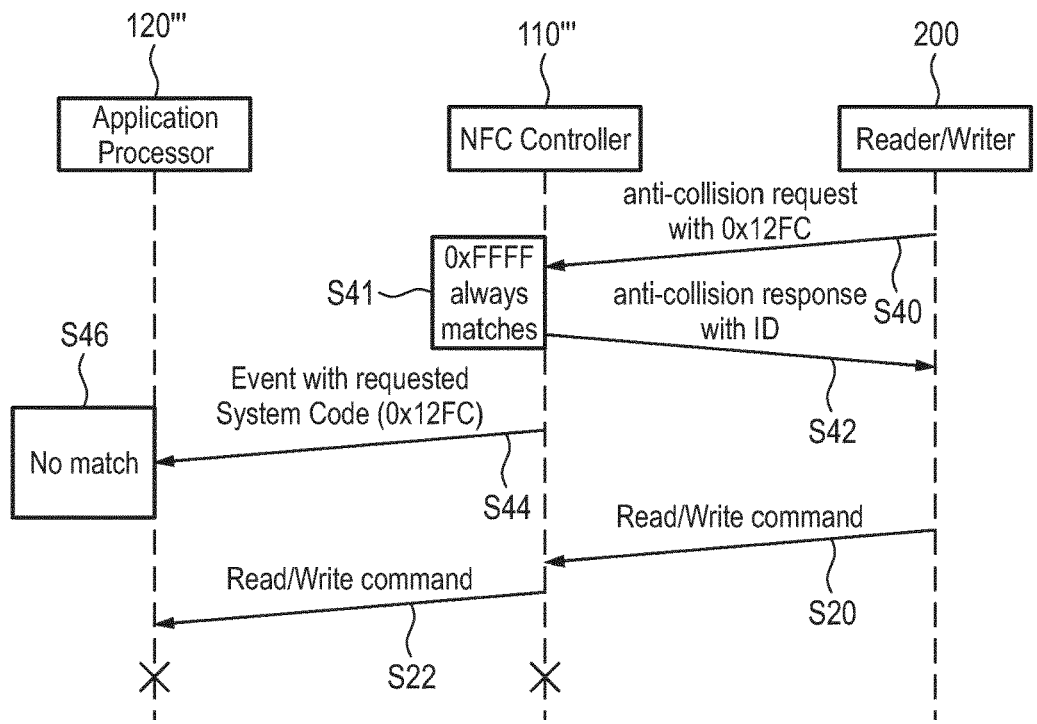
FIG. 5 shows a flowchart illustrating an embodiment of the communication between application processor, NFC controller and external reader/writer device according to the present disclosure in a second situation.
Figure 6:
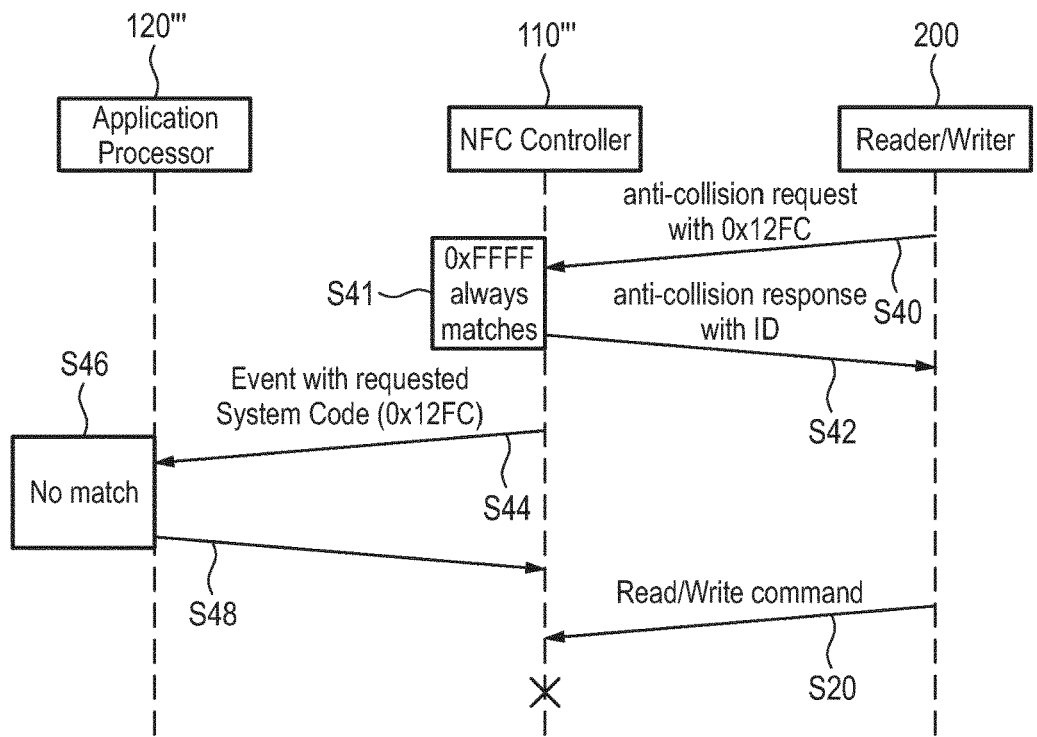
FIG. 6 shows a flowchart illustrating another embodiment of the communication between application processor, NFC controller and external reader/writer device according to the present disclosure in said second situation.

A second situation is illustrated in FIGS. 5 and 6. Even if the certain first identifier (0x12FF) is not stored in the second memory of the application processor 120''' (S46), the NFC controller 110''' will still forward the read/write command S20 received from the external reader/writer device 200 to the application processor 120''' (S22). However, the application processor 120''' cannot start any application and does therefore not send a response to the received read/write command. Consequently, no response is sent from the NFC controller 110''' to the external reader/writer device 200 in response to the read/write command S20. Hence, if there is no application registered for that system code, then no application is started and a timeout occurs, i.e. no communication between the external reader/writer device 200 and the application processor 120''' is not completely established.

In another embodiment, as shown in FIG. 6, the application processor 120''' actively informs the NFC controller 110''' if the certain first identifier is not stored in its second memory by sending a negative information notice S48 to the NFC controller. Consequently, the NFC controller 110''' will not forward a received read/write command S20 to the application processor 120''' so that already at this stage the communication establishment process is stopped.

Additionally or alternatively, the application processor 120''' may actively inform the NFC controller 110''' if the certain first identifier is stored in its second memory by sending a positive information notice to the NFC controller which will then continue handling read/write commands and responses as shown in FIG. 4.

Thus, as explained above by use of FIGS. 4 to 6 the information, whether or not the certain first identifier is stored in the application processor 120''' can be—explicitly or implicitly—provided in different forms to the NFC controller 110'''.

Figure 7:
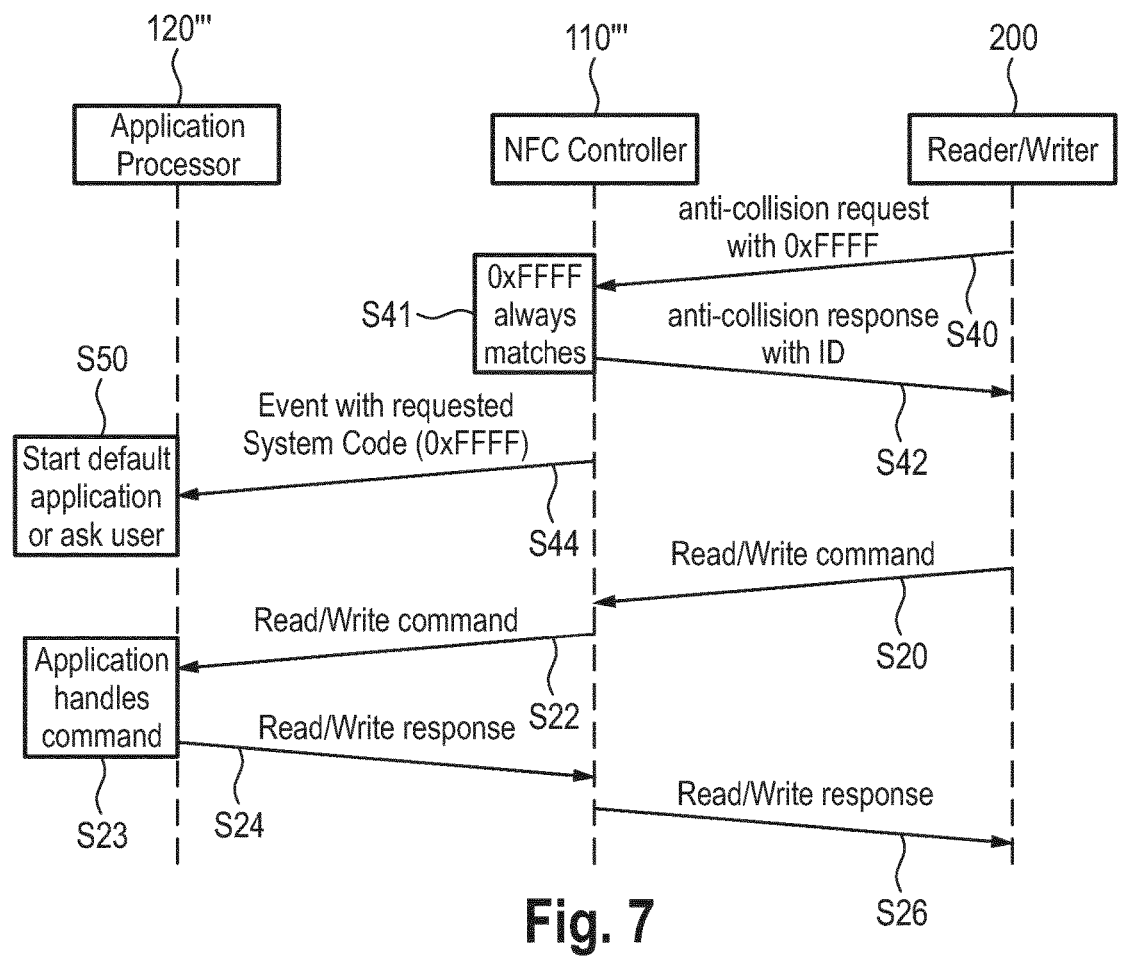
FIG. 7 shows a flowchart illustrating an embodiment of the communication between application processor, NFC controller and external reader/writer device according to the present disclosure in a third situation.

A third situation is illustrated in FIG. 7. In this situation it is assumed that the certain first identifier is a special identifier, e.g. is identical to the check identifier 0xFFFF. This certain first identifier will also match with the check identifier and the event will also be sent to the application processor 120'''. The difference is, however, that the application processor 120''' (in particular the operating system) does not have any information from the reader/writer device 200 about which application to start. Therefore the application processor 120''' can either start (S50) a default application (if one was configured) and/or it can ask (not explicitly shown, but e.g. as part of step S50) the user to select one application to use. This latter approach may e.g. require the user to touch the reader/writer device 200 a second time after the application was started to allow the application to receive the commands from the reader/writer device 200 (as the reader/writer device 200 will time out while the user selects the application).

Hence, by configuring a data set that ensures that an incoming request always (or in selected/most situations) matches and combining it with an event mechanism, e.g. the event mechanism as described in US 2012/0092137 A1, a single entry in the NFC controller can support any number of applications based on HCE.

Figure 8:
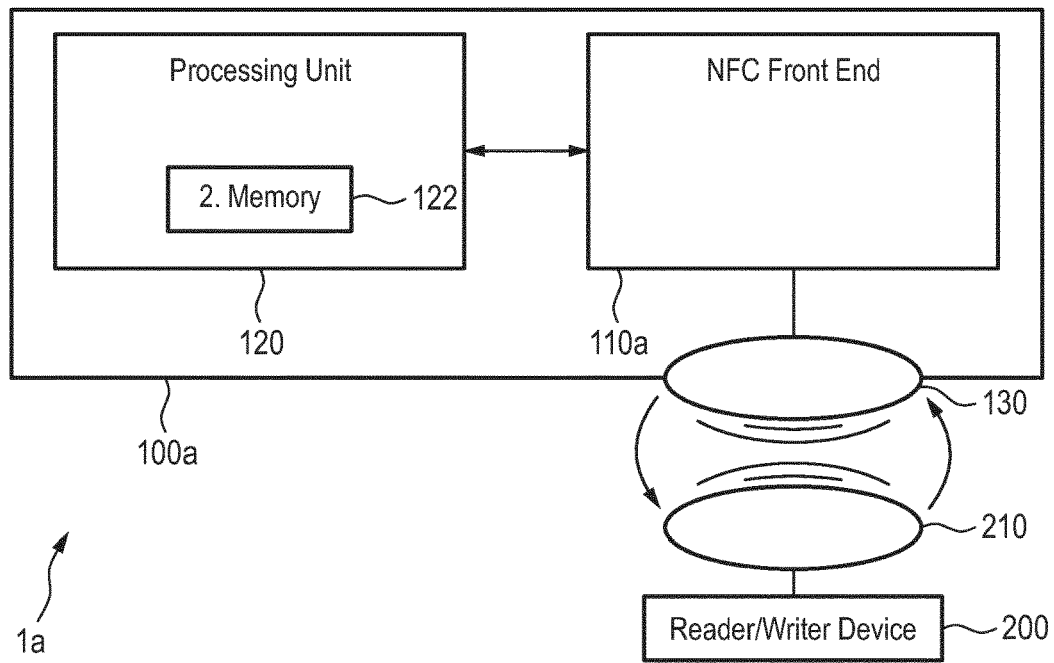
FIG. 8 shows a schematic diagram of another embodiment of an electronic device and system according to the present disclosure.
Figure 9:
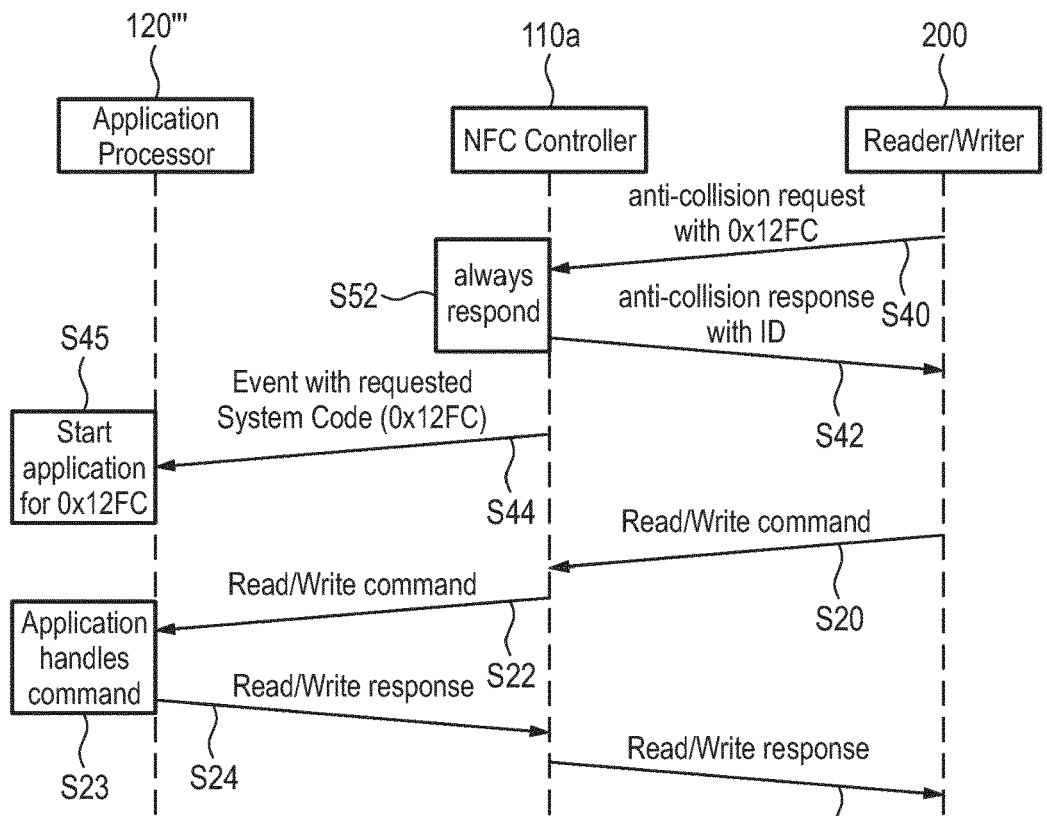
FIG. 9 shows a flowchart illustrating an embodiment of the communication between application processor, NFC controller and external reader/writer device as shown in FIG. 8 according to the present disclosure in said first situation.

Still another embodiment of a device 100*a*, system 1*a* and method according to the present disclosure is depicted in FIGS. 8 and 9. In this embodiment of the system 1*a* the NFC front end unit 110*a* does not comprise a first memory (112 in FIG. 1) or does at least not require the storage of a check identifier as explained above. Instead, the front end unit 110*a* is configured to always respond to anti-collision requests received from an external reader/writer device 200.

Hence, instead of the step S41 (as shown in FIGS. 4 to 7) of checking if the received certain first identifier matches a check identifier, an alternative step S52 is provided in which the front end unit 110a always generates a response to the received anti-collision request. This avoids the need to store a check identifier and to check a received first identifier against a check identifier, i.e. saves valuable storage space and handling time. Apart from this difference, the subsequent handling is generally made in the same way as explained above.

Generally, the electronic device 100 may provide a large number of applications. In an embodiment, the first and second identifiers may be application identifiers. In other words, the first and second identifiers may be used for identifying an application. This, however, is not mandatory. The first and second identifiers could identify other entities, such as a system which can host multiple applications. Examples of applications are: payment, public transport ticketing, events tickets, loyalty programs, coupons, data exchange, e.g. business cards, web addresses, network configuration data (e.g. for Wi-Fi networks), images and the like.

In a further embodiment the electronic device may be an electronic device enabling FeliCa™ services, i.e. the electronic device would emulate a FeliCa card. In this case the first identifier may also be referred to as system code and the second identifier may be referred to as a card number (IDm). The system code identifies the authority that is responsible for managing the memory on the card. An example for an authority is e.g. "SuiCa"™, Transport ticket by East Japan Railways, [JR East]. In other words, there is an embodiment where the first identifier identifies the authority that is responsible for managing the data structures within the second memory. The authority may also own the encryption keys of the respective memory areas.

It should also be noted, that type B specified by ISO/IEC14443 includes a concept that is another embodiment for a first identifier. Type B has the notion of an "application family identifier" (AFI). There are values specified for different application families (e.g. for payment of public transport). The reader/writer can "search" for a specific AFI and the cards tell their AFI to the reader/writer during anti-collision.

In a further embodiment, the second identifier may be a card number of a card the electronic device 100 emulates. The card number may be unique for at least one communication session. Alternatively, it is also possible that the card number is unique for the lifetime of the card. This number is the "address" of the card. The address would, thus, be included in the response to the communication establishment request and be used in the first communication by the reader/writer device to address a card in the field (each following commands would typically include such an address as one of the first parameters). Otherwise the reader/writer device could not send a command to a specific card (electronic device 100 emulating the card) but all cards (e.g. other electronic devices) in the field would answer to a command. Therefore, this number (second identifier) is not associated with an application but with a generic means used in the reader/writer card communication (similar to an IP address of a computer having multiple IP-based applications). If the card number is unique for at least one communication session this allows to uniquely address the card and/or application during communication and avoids that other cards in the range of the NFC field be addressed.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. An electronic device for near field communication, NFC, said device including:
   a front end unit adapted to communicate with an external reader/writer device, and
   a processing unit including a second memory being adapted to store one or more applications and one or more first identifiers, wherein a first identifier is assigned to one or more applications,
   wherein the front end unit is further adapted to
   receive a communication establishment request from the external reader/writer device, the communication establishment request including a certain first identifier,
   send a response to the reader/writer device and the certain first identifier to the processing unit, when a communication establishment request is received, if the certain first identifier matches a check identifier stored in the front end unit or if the front end unit is configured to send a response to all communication establishment requests, the response including an arbitrary or predetermined second identifier,
   receive a communication command from the external reader/writer device and forward it to the processing unit, and check if a communication response is received from the processing unit in response to a communication command and, if received, forward it to the external reader/writer device.

2. The electronic device as defined in embodiment 1, wherein the processing unit is adapted to check if the certain first identifier is stored in the second memory.

3. The electronic device as defined in embodiment 2, wherein the processing unit it adapted to respond to a communication command received from the front end unit if the certain first identifier is stored in the second memory and not to respond to a communication command received from the front end unit if the certain first identifier is not stored in the second memory.

4. The electronic device as defined in embodiment 2, wherein the processing unit it adapted to send a negative information notice to the front end unit if the certain first identifier is not stored in the second memory to inform the front end unit that the certain first identifier is not stored in the second memory.

5. The electronic device as defined in embodiment 4, wherein the front end unit is adapted to forward a communication command received from the external reader/writer device to the processing unit only if no negative information notice has been received from the processing unit.

6. The electronic device as defined in embodiment 2, wherein the processing unit it adapted to send a positive information notice to the front end unit if the certain first identifier is stored in the second memory to inform the front end unit that the certain first identifier is stored in the second memory.

7. The electronic device as defined in embodiment 1, wherein the processing unit is configured to start a default application or issue a request the user of the electronic device to select or indicate an application to be started if the received certain first identifier is assigned to no application or to more than one application.

8. The electronic device as defined in embodiment 1, wherein the check identifier comprises one or more wild cards.

9. The electronic device as defined in embodiment 1 wherein the check identifier is a system code comprising one or more wild cards.

10. The electronic device as defined in embodiment 1, wherein the certain first identifier is an application identifier for identifying an application of the electronic device or a system code.

11. The electronic device as defined in embodiment 1, wherein the certain first identifier is an application family identifier in accordance with the ISO/IEC 14443 standard.

12. The electronic device as defined in embodiment 1, wherein the second memory is included in a secure element.

13. The electronic device as defined in embodiment 1, wherein the front end unit is adapted to check the second identifier included in communication commands received from the external reader/writer device to distinguish different external reader/writer devices.

14. The electronic device as defined in embodiment 1, wherein the front end unit includes a first memory adapted to store a check identifier, said check identifier being adapted to match one or more first identifiers.

15. A method for near field communication, NFC, said method including:
   receiving, by a front end unit, a communication establishment request from an external reader/writer device, the communication establishment request including a certain first identifier,
   sending a response to the reader/writer device and the certain first identifier to a processing unit, when a communication establishment request is received, if the certain first identifier matches a check identifier stored in the front end unit or if the front end unit is configured to send a response to all communication establishment requests, the response including an arbitrary or predetermined second identifier,
   receiving a communication command from the external reader/writer device and forward it to the processing unit, and
   checking if a communication response is received from the processing unit in response to a communication command and, if received, forwarding it to the external reader/writer device.

16. A non-transitory computer-readable recording medium that stores therein a computer program product, which, when executed by a processor, causes the method according to embodiment 15 to be performed.

17. An electronic system for near field communication, NFC, said system comprising:
   an external reader; writer device and
   an electronic device as defined in embodiment 1 adapted to communicate with the external reader/writer device.

18. A computer program including program code means for causing a computer to perform the steps of said method according to embodiment 15 when said computer program is carried out on a computer.

The invention claimed is:

1. An electronic device for near field communication, NFC, said device comprising:
   a front end unit configured to communicate with an external reader/writer device, and
   a processing unit including a second memory configured to store one or more applications and one or more first identifiers, wherein
   a first identifier is assigned to one or more applications, the front end unit is further configured to:
      receive a communication establishment request including a certain first identifier from the external reader/writer device,
      when the communication establishment request is received and the certain first identifier matches a check identifier stored in the front end unit, send a response including an arbitrary or predetermined second identifier to the reader/writer device and send the certain first identifier to the processing unit,
      when the communication establishment request is received and the front end unit is configured to send a response to all received communication establishment requests, send the response to the reader/writer device and send the certain first identifier to the processing unit,
      receive a communication command from the external reader/writer device and forward the communication command to the processing unit, and
      check if a communication response is received from the processing unit in response to the communication command and, if received, forward the communication response to the external reader/writer device, and
   the processing unit is configured to send an information notice to front end unit based upon whether or not the certain first identifier is stored in the second memory.

2. The electronic device as claimed in claim 1, wherein the processing unit is further configured to check if the certain first identifier is stored in the second memory.

3. The electronic device as claimed in claim 2, wherein the processing unit is configured to respond to the communication command received from the front end unit if the certain first identifier is stored in the second memory and not to respond to the communication command received from the front end unit if the certain first identifier is not stored in the second memory.

4. The electronic device as claimed in claim 2, wherein the processing unit is further configured to send a negative information notice to the front end unit if the certain first identifier is not stored in the second memory to inform the front end unit that the certain first identifier is not stored in the second memory.

5. The electronic device as claimed in claim 4, wherein the front end unit is further configured to forward the communication command received from the external reader/writer device to the processing unit only if no negative information notice has been received from the processing unit.

6. The electronic device as claimed in claim 2, wherein the processing unit is further configured to send a positive information notice to the front end unit if the certain first identifier is stored in the second memory to inform the front end unit that the certain first identifier is stored in the second memory.

7. The electronic device as claimed in claim 1, wherein the processing unit is further configured to start a default application or issue a request to a user of the electronic device to select or indicate an application to be started if the certain first identifier is assigned to no application or to more than one application.

8. The electronic device as claimed in claim 1, wherein the check identifier comprises one or more wild cards.

9. The electronic device as claimed in claim 1, wherein the check identifier is a system code comprising one or more wild cards.

10. The electronic device as claimed in claim 1, wherein the certain first identifier is an application identifier for identifying an application of the electronic device or a system code.

11. The electronic device as claimed in claim 1, wherein the certain first identifier is an application family identifier in accordance with the ISO/IEC 14443 standard.

12. The electronic device as claimed in claim 1, wherein the second memory is included in a secure element.

13. The electronic device as claimed in claim 1, wherein the front end unit is further configured to check the second identifier included in communication commands received from the external reader/writer device to distinguish different external reader/writer devices.

14. The electronic device as claimed in claim 1, wherein the front end unit includes a first memory configured to store the check identifier, said check identifier being adapted to match one or more first identifiers.

15. An electronic system for NFC, said system comprising:
the external reader/writer device, and
the electronic device as claimed in claim 1 adapted to communicate with the external reader/writer device.

16. A method for near field communication, NFC, said method comprising:
receiving, by a front end unit, a communication establishment request including a certain first identifier from an external reader/writer device,
sending a response including an arbitrary or predetermined second identifier to the reader/writer device and sending the certain first identifier to a processing unit when the communication establishment request is received and the certain first identifier matches a check identifier stored in the front end unit, the processing unit including a second memory configured to store one or more applications and one or more first identifiers,
sending the response to the reader/writer device and sending the certain first identifier to the processing unit when the communication establishment request and the front end unit is configured to send a response to all received communication establishment requests,
receiving a communication command from the external reader/writer device and forwarding the communication command to the processing unit,
checking if a communication response is received from the processing unit in response to the communication command and, if received, forwarding the communication response to the external reader/writer device, and
sending, by the processing unit, an information notice to front end unit based upon whether or not the certain first identifier is stored in the second memory.

17. A non-transitory computer-readable recording medium that stores therein a computer program product including instructions, which, when executed by a processor, cause the method according to claim 16 to be performed.

* * * * *